Oct. 30, 1956 — R. B. IMMEL — 2,769,131
MOTOR ACCELERATION SYSTEM
Filed Oct. 30, 1953 — 2 Sheets-Sheet 1
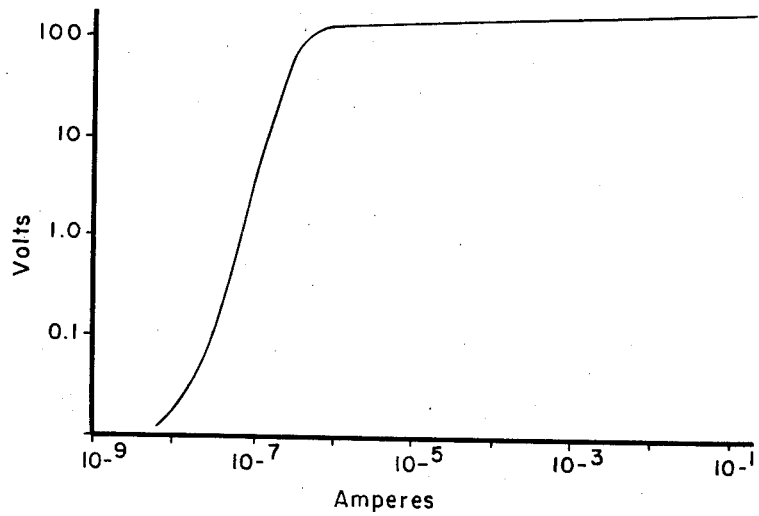
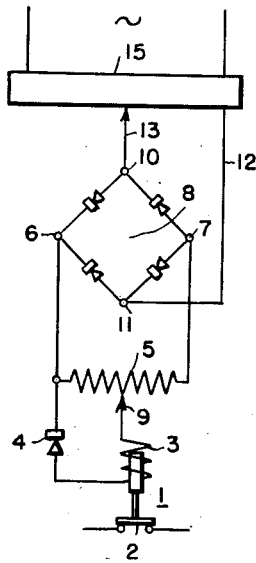
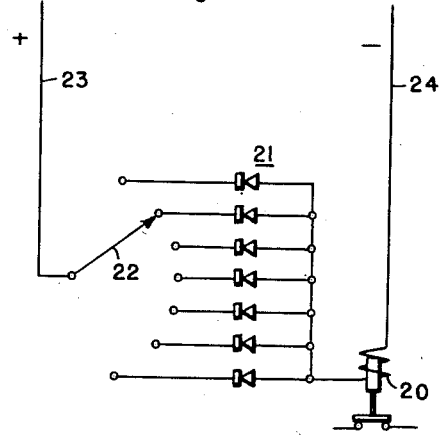
WITNESSES:
INVENTOR
Ralph B. Immel.
BY
ATTORNEY Oct. 30, 1956  R. B. IMMEL  2,769,131
MOTOR ACCELERATION SYSTEM
Filed Oct. 30, 1953  2 Sheets-Sheet 2

WITNESSES:
E. A. McCloskey
Leon J. Laza

INVENTOR
Ralph B. Immel.
BY
Paul E. Friedemann
ATTORNEY

United States Patent Office 2,769,131
Patented Oct. 30, 1956

2,769,131

MOTOR ACCELERATION SYSTEM

Ralph B. Immel, Williamsville, N. Y., assignor to Westinghouse Electric Corporation, East Pittsburgh, Pa., a corporation of Pennsylvania Application October 30, 1953, Serial No. 389,386

5 Claims. (Cl. 318—395)

This invention relates to electrical control apparatus and more particularly to a voltage sensitive relay system and applications of the system.

One object of this invention is to provide a relay system which is sensitive to very small voltage changes.

Another object of this invention is to provide a relay system wherein the increment between the relay pick-up voltage and the drop-out voltage is very small.

Yet another object of this invention is to provide a simple, positive operating, low cost, voltage sensitive relay system.

Still another object of this invention is to provide a voltage sensitive relay system which has an adjustable operating point.

Another object of this invention is to provide a voltage sensitive relay system capable of a large variety of uses in electrical systems.

A further object of this invention is to provide a relay system of the mentioned character to provide overload protection for electrical systems.

Another object of this invention is to provide a system of the character referred to for starting systems for electric motors.

The objects stated are merely illustrative. These and other objects will become apparent from a study of the following specification and accompanying drawings, wherein:

Fig. 1 shows a reverse voltage characteristic for a silicon rectifier;

Fig. 2 shows one embodiment of the invention used as an adjustable alternating-current voltage relay;

Fig. 3 shows the invention as an adjustable direct-current voltage relay;

Figure 4:
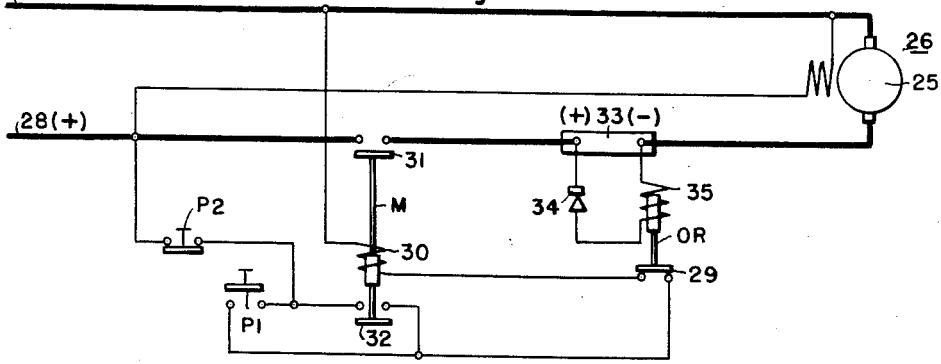
Fig. 4 shows an application of the relay for instantaneous overload protection.

The invention relies upon the sharp non-destructive breakdown characteristics of a silicon rectifier used in conjunction with an ordinary direct-current relay to provide a relay system which is extremely sensitive to voltage changes. Fig. 1 shows the reverse voltage characteristics of a silicon rectifier. The voltage is plotted along the ordinate and the current in amperes is plotted along the abscissa. For purposes of illustration, the silicon rectifier is used, however any other unidirectional conductive device or p—n junction rectifying device which is not destroyed by a reverse current may be used. For example, the germanium rectifier might also be used. Rectifying devices such as selenium and copper oxide rectifiers are not suitable for the applications described herein, since they will be destroyed by a breakdown, that is, if a current is forced through the rectifier in opposition to its normal polarity, the rectifying action will no longer occur, whereas in the case of the silicon rectifier, breakdown can occur repeatedly without destroying the rectifying characteristics of the rectifier. This characteristic is commonly known as the "Zenner Effect."

Fig. 2 shows the basic circuit of the invention. A relay 1 having contacts 2 and a coil 3 is provided to control an electrical circuit. The coil 3, connected in series with a silicon rectifier 4, is, by means of tap 9, connected across a portion of the impedance 5. The impedance 5 is supplied with a direct-current voltage from the output terminals 6 and 7 of a full-wave rectifier 8. By changing the position of tap 9, the amount of impedance across which the series circuit containing the rectifier 4 and the relay coil 3 is connected may be varied.

From the curve shown in Fig. 1, when a reverse voltage is applied to the circuit shown in Fig. 2, it may be seen that a very small change in voltage at the breakdown point will cause a very large change in the current flowing. For example, if the relay 1 picks up on a minimum of $10^{-4}$ amperes and drops out at $10^{-6}$ amperes, the relay will remain picked up only when the breakdown voltage is reached or exceeded and will drop out when the voltage applied to the coil is less than the breakdown voltage. The voltage increment between that voltage which is necessary to supply the relay coil with the current of $10^{-4}$ amperes and the breakdown voltage is very small. The relay 1 may be an ordinary direct-current relay as the current flow at rectifier breakdown will always be sufficient to seal the relay armature. There will be no armature flutter on pick-up or drop-out.

Fig. 2 also shows how the system is used as an adjustable alternating-current voltage relay. That is, the input terminals 10 and 11 are connected by the lead 12 and a tap 13 across a portion of an adjustable impedance 15. The impedance 15 is adapted to be connected across an alternating-current supply. By varying the position of the tap 13 on the impedance 15, the relay 1 operates as an adjustable alternating-current voltage relay.

Fig. 3 shows another method of obtaining an adjustable direct-current voltage relay. The relay 20 is again an ordinary direct-current voltage relay, and a bank or group of silicon rectifiers 21 each having different breakdown voltage values is arranged so the individual rectifiers may be selectively connected in series with the electromagnetic relay 20 by means of the tap 22 and the series combination is connected across the direct-current source by leads 23 and 24. The lead 23 is positive and the lead 24 is negative and, therefore, the reverse voltage characteristics of the rectifiers will control. Since the individual silicon rectifiers have different breakdown voltage values, the voltage required to force the necessary pick-up current through the coil of the relay 20 will differ in accordance with the breakdown voltage value for the individual rectifier.

Fig. 4 shows the relay system as applied to provide instantaneous overload protection for a circuit which contains the armature 25 of a motor 26. The circuit to be protected could be of any other type. The leads 27 and 28 are supplied from a suitable direct-current source and, upon depressing the start push button P1, a circuit is completed from the positive lead 28 through the contacts of the stop push button P2, the contacts of the start push button P1, the contacts 29 of the overload relay OR, and through the coil 30 of the motor start relay M to the negative lead 27. Energization of the coil 30 of the motor start relay M causes its contacts 31 and 32 to close. The closing of the contacts 32 simply bypasses the contacts of the push button P1 to seal the coil 30 of the motor start relay M into the circuit. The closing of the contacts 31 completes the circuit from the lead 28, through the contacts 31, an impedance or shunt 33 and through the armature of the motor 25 to the opposite lead 27, and thus the motor 26 is energized. Since the lead 28 is positive, the terminals of the impedance or shunt 33 will bear the polarities shown. A silicon rectifier 34, which is connected in series circuit relationship with the coil 35 of the overload relay OR and the series combination, is connected across the impedance or shunt 33. The rectifier 34 is poled to oppose the flow of current through the coil 35 of the overload relay OR. If the current in the circuit of the armature 25 of the motor 26 should exceed the predetermined value at which the circuit is to be protected, the drop across the shunt or impedance 33 will exceed the breakdown voltage of the silicon rectifier 34 and thus will cause the coil 35 of the overload relay OR to be energized. When the coil 35 of the overload relay OR is energized, the contacts 29 of the overload relay OR open and break the circuit which energizes the coil 30 of the motor start relay M. Deenergizing the coil 30 of the motor start relay M causes contacts 31 to remove the circuit of the armature 25 from the line to protect the circuit from the overload. The contacts 32 of the motor start relay M are also opened so that it will be necessary to depress the start push button P1 before the armature 25 of the motor 26 can again be placed across the line. It will be appreciated that the relay as applied to this circuit provides instantaneous overload protection.

Figure 5:
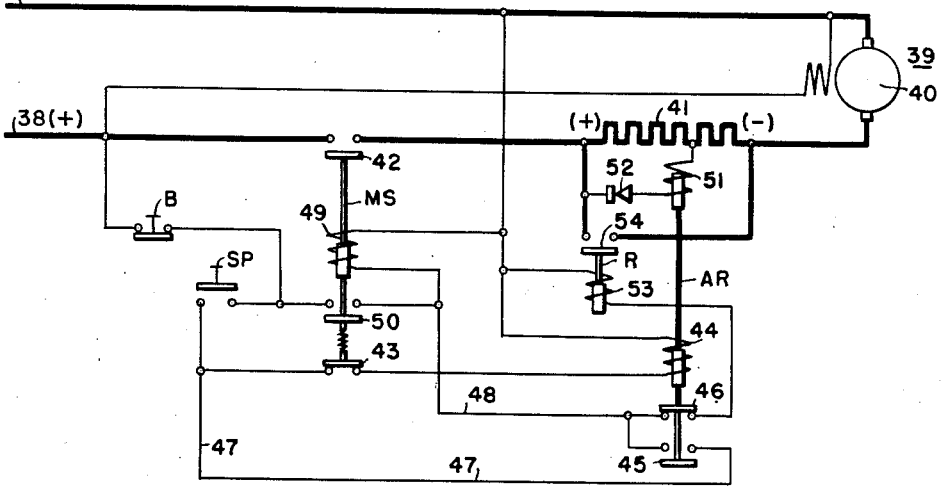
Fig. 5 shows an embodiment of the invention as applied as an accelerating relay to a current limit starter.

Fig. 5 shows the invention as applied to provide proper acceleration for an electric motor with a current limit starter. The circuit is supplied from a suitable direct-current source connected between the leads 37 and 38. The motor 39 which is to be accelerated has its armature 40 connected in series with a current limit impedance 41 and the contacts 42 of the motor starting relay MS. In order to start the motor 39, the start push button SP is depressed to provide a circuit from the positive lead 38 through the contacts of the stop push button B, the contacts of the start push button SP, contacts 43 of the motor start relay MS, the pick-up coil 44 of the accelerating relay AR to the negative lead 37. Thus, the accelerating relay AR is picked up to close its contacts 45 and open its contacts 46. Closing the contacts 45 sets up a circuit from the positive lead 38, through the contacts of the stop push button B, the contacts of the start push button SP, through the lead 47, the contacts 45 of the acceleration relay AR, lead 48, the coil 49 of the motor start relay MS to the negative lead 37, thus closing the contacts 42 and 50 and opening the contacts 43 of the motor start relay MS. Closing the contacts 50 of the motor start relay MS simple seals its coil 49 in the circuit and makes its energization independent of the starter push button SP. Closing the contacts 42 completes the circuit from the positive lead 38 through the impedance 41 and armature 40 of the motor 39 to the negative lead 37. The contacts 43 on the motor start relay MS are a delayed break type of contact so that the circuit for the pick-up coil 44 of the acceleration relay AR is not immediately broken when the motor start relay MS is energized.

The hold coil 51 of the acceleration relay AR is connected in series with the silicon rectifier 52 across a portion of the current limit impedance 41, and the silicon rectifier is poled so as to oppose the flow of current through its series circuit for a voltage drop of normal polarity across the impedance 41 as indicated on Fig. 5. The in-rush current through the starting impedance 41 is relatively high, and the characteristic of the silicon rectifier 52 is such that the voltage across the portion of the starting impedance 41 to which the silicon rectifier 52 and hold relay coil 51 are connected exceeds the breakdown voltage of the rectifier 52, and thus the acceleration relay AR will be held in its energized position even after the delayed break contacts 43 of the motor start relay MS have opened.

As the motor 39 accelerates, the current in the circuit of its armature 40 decreases and the drop across the current limit impedance 41 decreases. When the voltage drops to the critical value of the silicon rectifier 52, the hold coil 51 of the acceleration relay AR is deenergized. That is, the current through the hold coil 51 decreases to a point below the drop-out value, and the acceleration relay AR will drop out. The silicon rectifier 52 is selected to have characteristics which will give the desired acceleration of the motor 39.

When the acceleration relay AR drops out, it closes its contacts 46 and thus completes the circuit from the positive lead 38 through the contacts of the stop push button B, the contacts 50 of the motor start relay MS, lead 48, contacts 46 of the acceleration relay AR, the coil 53 of the run relay R to the negative lead 37. Thus, the run relay R will be picked up to close its contacts 54 and thus short out the starting impedance 41 and allow the motor 39 to come up to normal speed and run with its rated armature voltage and current. When the acceleration relay AR drops out, it also opens its contacts 45. Thus, if the stop push button B were opened to cause the motor start relay MS to drop out and open its lock-out contacts 50, the system would have to go through the entire sequence of operation just described to start the motor again.

Figure 6:
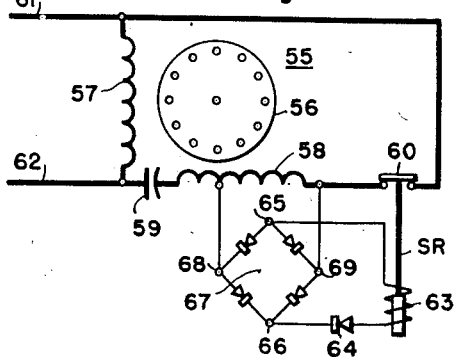
Fig. 6 shows the invention applied as a starting relay for a single phase capacitor start induction run motor.

Fig. 6 shows a circuit where the relay system is utilized to start a single phase capacitor start induction run motor. Although it will be obvious that the principle could be applied to starting other types of single-phase motors, Fig. 6 shows the single-phase motor 55 having an armature 56, a main or run winding 57 and a starting winding 58 in series with a starting capacitor 59. The starting winding 58 and starting capacitor 59 are connected in series with the contacts 60 of the starting relay SR, and this series circuit is connected directly across the main winding 57. The circuit is energized by means of an alternating-current source connected directly across the leads 61 and 62.

The starting relay SR has a coil 63 connected in flux exchange relationship with the armature of the starting relay, and the coil 63 is connected in series with the silicon rectifier 64. This series circuit is connected across the output terminals 65 and 66 of the full-wave rectifier 67, and the input terminals 68 and 69 of the full-wave bridge rectifier 67 are connected across a portion of the starting winding 58. It will be seen that the output terminal 66 of the full-wave bridge rectifier 67 is the positive terminal and that the silicon rectifier 64 is poled in such a manner as to oppose the flow of current through the coil 63 of the starting relay SR.

When an alternating-current source is connected across the leads 61 and 62, the motor 55 is energized. As the speed of the motor increases, the voltage across the starting winding increases. When the voltage across the input terminals 68 and 69 reaches the critical value, the silicon rectifier 64 will "break down" and the starting relay SR will open its contacts 60, and the starting winding and capacitor are then disconnected from the line. The starting winding, even when disconnected, has a voltage induced in it when the motor 55 is energized which is sufficient to operat the starting relay SR and thus keeps the starting winding 58 out of the circuit until the motor is deenergized. When the motor is deenergized, the voltage across the starting winding 58 will decrease until it passes the critical value, and the starting relay SR will drop out to close its contacts 60, thus placing the starting winding 58 and starting capacitor 59 across the main winding 57 again, and thus the single-phase motor can be started again when the motor 55 is energized.

It may be seen that the objects of the invention have been accomplished by utilizing the reverse voltage characteristics of the silicon rectifier or any other type of rectifier having similar reverse voltage characteristics and which will not be destroyed by current flow in the reverse direction to provide a simple positive operating voltage sensitive relay system which has many applications. The circuits shown and described are only a few of the applications where a sensitive relay system of this type can be used.

In accordance with the patent statutes, a few of the best known embodiments of the invention have been shown and described in detail. However, it is to be particularly understood that the invention is not limited thereto or thereby, but that equivalents are clearly within the inventive scope.

I claim as my invention:

1. Apparatus for insuring the proper acceleration of an electric motor comprising the combination of an impedance device in series circuit relationship with the armature of the motor for limiting the current in the circuit, a silicon rectifier and an electromagnetic relay; said electromagnetic relay having a movable armature, circuit controlling means, and coil means in flux exchange relationship with said movable armature means, said movable armature means being responsive to the flux linking said coil means and the movable armature means to determine a condition of the circuit controlling means; said silicon rectifier and said coil means of said electromagnetic relay being connected in series, the operating range of said electromagnetic relay being within the range of current flow through said silicon rectifier in the reverse direction and said silicon rectifier and coil means being connected across at least a portion of said impedance device in such a manner that the silicon rectifier is poled to opposed current flow therethrough due to the voltage developed across said impedance device by a current flow in the normal direction through said impedance device, means to energize the series circuit which comprises the motor armature and said impedance device and to cause said relay to be picked up, the inrush starting current for said motor being of such a magnitude as to cause a reverse current to flow through said silicon rectifier and energize said coil means to maintain said relay in its picked up position, the operating range of said relay being such that said relay will drop out when the motor armature current has decreased a predetermined amount, said circuit controlling means of said relay being connected to said impedance device to cause said impedance device to be effectively removed from the series circuit when said relay drops out.

2. Apparatus for insuring the proper acceleration of an electric motor comprising the combination of an impedance device in series circuit relationship with the armature of the motor for limiting the current in the series circuit, a silicon rectifier circuit energizing means, and first, second and third electromagnetic relay means; said first electromagnetic relay having a movable armature, first and second circuit controlling means, and first and second coil means in flux exchange relationship with said movable armature means, said movable armature means being responsive to the flux linking the first and second coil means and the movable armature means to determine a condition of the first and second circuit controlling means; said silicon rectifier and the first coil means of said first electromagnetic relay being connected in series; said second and third electromagnetic relay means each having individual movable armatures, individual coil means in flux exchange relationship with their individual armatures, and individual circuit controlling means; the second coil means for said first electromagnetic relay being connected to be energized when said circuit energizing means is closed to pick up said first electromagnetic relay, the coil means for said second electromagnetic relay means being connected in the circuit controlled by the first circuit controlling means for said first electromagnetic relay in such a manner that it is energized when said first electromagnetic relay means is picked up, the circuit controlling means of said second electromagnetic relay means being connected to energize the series circuit of the motor armature and said impedance device, lock the coil means for said second electromagnetic relay means in an energizing circuit and open the circuit of said second coil means of said first electromagnetic relay means after a predetermined time interval; the pick-up point of said first electromagnetic relay means with respect to said first coil means being within the range of current flow through said silicon rectifier in the reverse direction due to the inrush current in the motor armature circuit when said second electromagnetic relay means closes said circuit and the drop-out point of said first electromagnetic relay means being at a predetermined magnitude of current in said circuit which is a predetermined amount less than the inrush current, the second circuit controlling means for said first electromagnetic relay means being connected to cause the coil means of said third electromagnetic relay means to be energized when said first electromagnetic relay means drops out, the circuit controlling means for said third electromagnetic relay means being connected to effectively remove said impedance device from the series circuit of the motor armature.

3. An acceleration control for a direct current motor comprising, an impedance device connected in series with the armature winding of said direct current motor, a control contactor having a coil and having normally open contacts disposed to shunt said impedance device, a main switch having normally open main contacts disposed to establish an energizing circuit for said armature winding and having an operating coil, an accelerating relay having an operating coil and a holding coil and having normally open and normally closed contacts, circuit means including a silicon rectifier connecting said holding coil across at least a portion of said impedance device, said rectifier being poled in opposition to the voltage due to normal current flow through said impedance device, said normally closed contacts of said accelerating relay being connected to control energization of the coil of said control contactor, said normally open contacts of said accelerating relay being connected to control energization of said main switch, circuit means connected to momentarily energize said operating coil of said accelerating relay, and contact means actuated by said main switch for maintaining the coil thereof energized independently of said normally open contact of said accelerating relay.

4. An acceleration control for a direct current motor comprising, an impedance device connected in series with the armature winding of said motor, a control contactor having an operating coil and having normally open contacts disposed to shunt said impedance device, a main switch having normally open main contacts disposed to establish an energizing circuit for said armature winding, an operating coil and normally open and normally closed auxiliary contacts; an accelerating relay having two coils and normally open and normally closed contacts, a start switch connected in series with the normally closed auxiliary contacts of said main switch and one coil of said accelerating relay for operating said accelerating relay, a silicon rectifier connected in series with the other coil of said accelerating relay across at least a portion of said impedance device and poled in opposition to the voltage across said impedance device due to normal current flow therethrough, circuit means connecting said start switch in series with the normally open contacts of said accelerating relay and the coil of said main switch for energizing said main switch and closing the main contacts thereof to energize said armature winding, and circuit means connecting the normally open auxiliary contacts of said main switch in series with the normally closed contacts of said accelerating relay and the coil of said control contactor to energize said control contactor when said accelerating relay drops out due to the drop in impedance voltage as motor speed increases during the motor accelerating period.

5. An acceleration control for a direct current motor comprising, an impedance device connected in series with the armature winding of said direct current motor, a control contactor having a coil and contacts disposed to shunt at least a portion of said impedance device, an accelerating relay movable between operative and inoperative positions and having contacts which are closed in said inoperative position, circuit means connecting said contacts of said accelerating relay in series with the coil of said control contactor to energize said control contactor when said accelerating relay is in said inoperative position, and means for holding said accelerating relay in operative position during acceleration of said motor including a silicon rectifier connected in series with the coil of said accelerating relay across at least a portion of said impedance device and poled in opposition to the voltage across said impedance device due to motor accelerating current.

References Cited in the file of this patent

UNITED STATES PATENTS

| | | |
|---|---|---|
| 1,741,375 | Niles et al. | Dec. 31, 1929 |
| 1,885,908 | Gilson | Nov. 1, 1932 |
| 1,915,137 | Stevens et al. | June 20, 1933 |
| 2,086,910 | Hansell | July 13, 1937 |
| 2,282,344 | Ruben | May 12, 1942 |
| 2,418,516 | Lidow | Apr. 8, 1947 |
| 2,473,617 | Stiefel | June 21, 1949 |
| 2,650,341 | Jones | Aug. 25, 1953 |